UNITED STATES PATENT OFFICE.

CLAUDINE RIBOD WEYER, OF LYONS, FRANCE.

IMPROVEMENT IN ANNEALING GLASS.

Specification forming part of Letters Patent No. 210,731, dated December 10, 1878; application filed August 29, 1877; patented in France, June 7, 1877.

*To all whom it may concern:*

Be it known that I, Madame WEYER, (born CLAUDINE RIBOD,) of Lyons, France, have invented Improvements in Annealing Glass; and I do hereby declare that the following is a full, clear, and exact description of the same.

This invention relates to improvements in annealing glass; and consists in burying or immersing the glass, when cold, in solid substances reduced to powder, such as pounded stone, plaster, lime, fire-clay, and, in short, any solid capable of attaining the degree of heat necessary for the annealing operation.

The object of the process is to render articles of glass stronger and more capable of sustaining transitions of heat and cold. Ordinary lamp-chimneys, for example, are liable to crack under a considerable variation of temperature, or by a drop of cold water touching them while hot; but after having been annealed by this process they may, when highly heated, be suddenly cooled, and even be immersed in cold water, without danger of cracking.

The champagne-bottles now used will sustain a pressure of about twenty-five to thirty atmospheres only; but if annealed by the processes of this invention they will support from forty to fifty atmospheres.

The annealing of glass has been but imperfectly effected heretofore, in consequence of insufficient heat, as, the articles being uncovered, the heat could not be raised beyond a certain point without danger of distorting the articles.

The articles of glass are placed in fire-clay pots or crucibles, the articles being first filled with, and then buried in, the pulverized solid substances, of which there should be a layer at least two inches thick above the uppermost article being treated. The pots or crucibles, being thus filled, are placed in the annealing-oven, which is constructed like those for annealing bottles generally used in glass-works. The heat is then gradually raised to 800° centigrade, or even 1,000° centigrade, according to the kind of article to be annealed, this heat being maintained four to six hours, in order to allow the molecules of the glass to arrange themselves.

The operation requires twenty-four hours for thick glass, such as bottles and decanters, sixteen to eighteen hours sufficing for thin goods.

I claim—

The improved process of annealing glass, consisting in burying or immersing the glass, when cold, in solid substances reduced to powder, such as pounded stone, plaster, lime, fire-clay, and, in short, any solid capable of attaining the degree of heat necessary for the annealing operation, substantially as and for the purpose herein specified.

CLAUDINE RIBOD WEYER.

Witnesses:
AUG. WEYER,
H. FESCHOTTE.